(12) United States Patent
Akers

(10) Patent No.: US 9,133,530 B2
(45) Date of Patent: Sep. 15, 2015

(54) HIGH MAGNETIC HARDENING ASSEMBLY AND METHOD

(71) Applicant: Ajax Tocco Magnethermic Corp., Albertville, AL (US)

(72) Inventor: Ronald R. Akers, Guntersville, AL (US)

(73) Assignee: AJAX TOCCO MAGNETHERMIC CORP., Albertville, AL (US)

(*) Notice: Subject to any disclaimer, the term of this patent is extended or adjusted under 35 U.S.C. 154(b) by 21 days.

(21) Appl. No.: 14/207,832

(22) Filed: Mar. 13, 2014

(65) Prior Publication Data

US 2014/0261913 A1 Sep. 18, 2014

Related U.S. Application Data

(60) Provisional application No. 61/782,112, filed on Mar. 14, 2013.

(51) Int. Cl.
*C21D 1/00* (2006.01)
*H05B 6/02* (2006.01)
*C21D 1/18* (2006.01)
*C21D 1/42* (2006.01)

(52) U.S. Cl.
CPC ... *C21D 1/18* (2013.01); *C21D 1/42* (2013.01)

(58) Field of Classification Search
CPC ............. C21D 1/18; C21D 1/42; H05B 6/101
See application file for complete search history.

(56) References Cited

U.S. PATENT DOCUMENTS

| 7,745,765 B2 | 6/2010 | Kisner et al. |
| 2011/0000588 A1 | 1/2011 | Bogicevic et al. |
| 2012/0091122 A1 | 4/2012 | Ahmad et al. |

FOREIGN PATENT DOCUMENTS

WO 2011130699 10/2011

*Primary Examiner* — Veronica F Faison
(74) *Attorney, Agent, or Firm* — Fay Sharpe LLP

(57) ABSTRACT

The present invention relates to an apparatus, system and method for heat treating metal parts that are stacked together and moved through an induction heating system and quench system. The present invention is specifically directed to an Induction Thermo Magnetic Processing (ITMP) apparatus, method and system which uses a magnetic field processing with induction high-frequency heat treatment to process metal components so as to inductively hardening materials.

20 Claims, 4 Drawing Sheets

| Date | | Reverse Idler Gear 3D FEA Model Comparison | | | | | | | | | | | | | |
|---|---|---|---|---|---|---|---|---|---|---|---|---|---|---|---|
| | Freq | Heat Time | Hold Time | Max Tip Temp | Max Tip Temp | 10 mm Surf Root Temp | 10 mm Surf Root Temp | 10 mm 1.5 mm Root Temp | 10 mm 1.5 mm Root Temp | 1.5 mm Root Delta | 1.5 mm Root Delta | Layer 1 Delta Temp | Layer 1 Delta Temp | Coil FEA Current | Coil FEA Volt | Total FEA Power |
| | kHz | sec | sec | deg C | deg F | deg C | deg F | deg C | deg F | deg C | deg F | Deg C | Deg F | amps | volts | kW |
| | 30 | 20 | 0 | 1217 | 2223 | 1070 | 1958 | 1004 | 1839 | 66 | 150.8 | 250.8 | 483.4 | 1045 | 181.3 | 19.14 |
| | 30 | 20 | 0 | 983 | 1801 | 860 | 1580 | 795.6 | 1464 | 64.4 | 147.9 | 214.6 | 418.3 | 950 | 164.4 | 15.7 |
| | 20 | 20 | 0 | 1227 | 2241 | 1111 | 2032 | 1050 | 1922 | 61 | 141.8 | 196.9 | 386.4 | 1245 | 146.4 | 20.64 |
| | 30 | 35 | 0 | 1053 | 1927 | 968 | 1774 | 912 | 1674 | 56 | 132.8 | 164.9 | 328.8 | 800 | 138.2 | 11.06 |

FIG. 3

HIGH MAGNETIC HARDENING ASSEMBLY AND METHOD

The present invention claim priority on U.S. Provisional Application Ser. No. 61/782,112 filed Mar. 14, 2013, which is incorporated herein by reference.

The present invention is directed to an induction hardening system, and particularly to a hardening system that utilizes high magnetic field processing. The present invention can be used to harden a material as the material is moved through a high magnetic field. The present invention can be used to harden a series of stacked components, more particularly to a hardening system that can harden a series of vertically stacked components, even more particularly to a hardening system that can harden a series of vertically stacked gears, and still even more particularly to a hardening system that can harden a series of vertically stacked gears by use of a high magnetic field. The present invention can also be used to harden a shaft, more particularly a solid shaft, even more particularly a vertically oriented shaft, and still even more particularly a vertically oriented shaft that is moved through a high magnetic field.

BACKGROUND OF THE INVENTION

Induction heating of individual parts to heat treat such parts has long been used. However, the sequential induction heating of a plurality of parts has encountered many difficulties. Mechanically handling the plurality of parts as such parts are continuously moved through induction coils has been problematic. In addition, the proper heating and quenching of the continuously moving parts has also been problematic. Non-limiting prior art systems are disclosed in U.S. Pat. No. 7,745,765; US 2011/0000588, US 2012/0091122 and WO 2011/130699, all of which are incorporated herein by reference.

In view of the current state of the art, there is a need for a device that can continuously heat and quench a plurality of parts that are sequentially moved past an induction heating coil.

SUMMARY OF THE INVENTION

The present invention is directed to an induction hardening system, and particularly to a hardening system that utilizes high magnetic field processing. The present invention can be used to harden a material as the material is vertically moved through a high magnetic field. The present invention can be used to harden a shaft, a series of stacked components, etc. In one non-limiting embodiment of the invention, a shaft (e.g., rod, pole, etc.) is hardened by the induction hardening system of the present invention. In another non-limiting embodiment of the invention, one or more gears are hardened by the induction hardening system of the present invention. When a plurality of components are to be hardened, the components can be oriented into a series of vertically stacked components that are vertically fed into a high magnetic field. Although the invention will be particularly described with reference to shafts and gears, it will be appreciated that other metal parts can be hardened by the apparatus and method of the present invention.

The present invention is directed to an apparatus that is a lower-energy, non-thermal alternative to conventional high-temperature heat treatment processing. The present invention is designed to reduce manufacturing process energy by reducing or eliminating energy-intensive processing steps such as, but not limited to, carburization and tempering. The apparatus of the present inventions can include Induction Thermo Magnetic Processing (ITMP) which uses a magnetic field processing with induction high-frequency (e.g., 2-50 kHz) heat treatment to process metal components at reduced energy use. This novel type of high magnetic field processing potentially represents a significant advancement in heat treating metal parts. The energy-efficient heat treat and forging technology that can be used in the present invention can result in increased energy productivity. In one non-limiting embodiment of the invention, there is provided an ITMP system that can continuously process metal components with sufficient throughput to enable commercialization for industrial power management products. In another and/or alternative non-limiting embodiment of the invention, there is provided an ITMP system that processes metal components having improved material properties such as bending-fatigue-life, thus leading to increased power density and reduced weight and cost, while replacing conventional energy-intensive methods like carburization. In still another and/or alternative non-limiting embodiment of the invention, there is provided an ITMP system that has improved electrical conductivity properties to enable energy and material savings. It has been found that ITMP optimization distributes defects/impurities in processed materials to increase fatigue strength, ductility and/or conductivity of the material. While other technologies, like carbon nano-tube composites, also can potentially be used to address similar properties of the process materials, they are not as technically or commercially mature for these applications.

The present invention is also directed to an apparatus, method and system for heat treating a plurality of metal parts (e.g., shafts, gears, etc.) as such parts are sequentially moved vertically in a column past one or more induction heating coils. In the past, multiple parts were heat treated by use of a horizontal walking beam. The present invention incorporates the use of a mechanical monolithic column of material to cancel out the magnetic forces that are applied to the column of metal parts that are heated by one or more induction coils. In this particular embodiment of the invention, the part to be inductively heated originates from a location remote to the magnet (e.g., positioned above the magnet). The part is moved into and assimilated in a column of parts that are then fed into the center of a high magnetic field (i.e., a magnetic field with a magnetic flux density of at least about 0.8 tesla). Generally, the assimilated column of parts is fed downwardly (i.e., vertically) toward and through the high magnetic field and the one or more induction heating coils; however, this is not required. During the movement of the part in the column of parts, each part in the column of parts is subject to substantial axial forces as the parts enter and leave the high magnetic field. Depending upon various configurations of the parts, there can also be substantial radial forces that the parts are subjected to as the parts enter and leave the high magnetic field. Oxidation of the metal parts, etc. that form in the column of parts can be reduced by increasing the speed of the components moving through the column and/or reducing the time the components remain in the column; however, this is not required.

The present invention is also directed to an apparatus, method and system for heat treating a single component (e.g., pipe, metal shaft, pole, rod etc.) as the single component is moved past one or more induction heating coils and through the high magnetic field. Generally, the single component is fed downwardly (i.e., vertically) toward and through the high magnetic field and the one or more induction heating coils; however, this is not required.

The present invention is also directed to an apparatus, method and system that includes the steps of 1) stacking metal parts (e.g., metal gears, shafts, etc.) onto a column of parts, 2) sequentially moving the column of metal parts into a high magnetic field (e.g., vertical movement), 3) induction heat treating the metal parts as the metal parts pass through the high magnetic field, 4) optionally sequentially quenching the heated metal parts, and 5) extracting the optionally quenched metal part from the column of parts. The quenching step, when used, can be by air, and/or liquid. The quenching step, when used, can be conducted partially or fully on the metal part while the metal part is still part of the column of parts, or partially or fully on the metal part after the metal part is separated from the column of parts.

During the entry of the metal part into the magnetic field, the part will be pulled/sucked into the high magnetic field. However, at a location at or near the maximum strength and/or uniform field processing position (e.g., about 35-60% from the bottom of the magnet bore or system), the forces applied to the metal part are neutralized by the pushing and pulling of the other metal parts in the stacked column. In such an arrangement, the stacked parts are generally connected together so that the forces applied to the parts as the parts are moved though the high magnetic field are transferred and shared by the parts in the stacked column; however, this is not required. After the metal part moves past the location at or near the maximum strength and/or uniform field processing position, the metal part resists extraction. The entry and extraction forces on the metal part can increase or decrease based on the speed at which the metal part is moved through the column. Generally, the part is removed from the stack of parts after the part has substantially or fully passed out from the high magnetic field so as to not adversely affect the transfer of forces along the column of stacked parts; however, this is not required. In one non-limiting arrangement, the parts are applied to the stack of parts and/or removed from the stack of parts when that part is exposed to less than about 10% of the maximum strength and/or uniform field of the high magnetic field, and typically less than about 5% of the maximum strength and/or uniform field of the high magnetic field, and still more typically less than about 1% of the maximum strength and/or uniform field of the high magnetic field, and still even more typically less than about 0.5% of the maximum strength and/or uniform field of the high magnetic field, and yet even more typically less than about 0.1% of the maximum strength and/or uniform field of the high magnetic field; however, this is not required.

It has been determined that, during the induction heating of a metal part that is passing through a high magnetic field, about 70% (+0.01-5%) (e.g., 65%, 65.01%, 65.02% . . . 74.98%, 74.99%, 75%) and any value or range therebetween of the carbon in the metal part needs to enter into solution during the heating process in order for the metal part, after being quenched, to significantly improve the fatigue strength of the metal part. If the metal part does not achieve the desired amount of carbon in solution during the heating process, then little or no improvement in fatigue strength is achieved. Likewise, if too much carbon enters into solution during the heating process, then little or no improvement in fatigue strength is also achieved. As such, if the metal part is not heated long enough or if the metal part is heated too long, the metal part, after being quenched, will exhibit little or no improvement in fatigue strength. It has been learned that it is important to control the speed at which the metal part passes through a high magnetic field so that the residence time of the metal part in the maximum strength and/or uniform field processing position for a given heating temperature is sufficient to obtain the desired amount of carbon in solution in the metal part. It has also be found that merely heating a metal part for about 0.1-200 seconds (e.g., 0.1 sec, 0.11 sec, 0.12 sec . . . 199.98 sec, 199.99 sec, 200 sec) and any value or range therebetween, generally 2-100 seconds and any value or range therebetween, typically 10-60 seconds and any value or range therebetween, and more typically about 20-30 seconds and any value or range therebetween as the metal part passes through a high magnetic field can achieve the desired percentage of carbon in solution that is necessary to obtain the desired improvement in fatigue strength of the metal part. This discovery is a significant achievement in the art of heat treating metal parts. Currently, metal parts are heat treated for about 15 to 60 minutes to obtain the desired improvement in fatigue strength of the metal part. The heat treating method, process and apparatus of the present invention significantly reduces the heating times of the metal part as compared to prior art heating processes.

It is one non-limiting object of the present invention, there is provided an apparatus, system, process and/or method for induction hardening of one or more parts that is a lower-energy, non-thermal alternative to conventional high-temperature heat treatment processing.

It is another and/or alternative non-limiting object of the present invention, there is provided an apparatus, system, process and/or method for induction hardening of parts that reduces manufacturing process energy by reducing or eliminating energy-intensive processing steps such as, but not limited to, carburization and tempering.

It is still another and/or alternative non-limiting object of the present invention, there is provided an apparatus, system, process and/or method for induction hardening of parts that utilizes high magnetic field processing.

It is yet another and/or alternative non-limiting object of the present invention, there is provided an apparatus, system, process and/or method for induction hardening of parts as the parts are moved through a high magnetic field as the parts are inductively heated.

It is still yet another and/or alternative non-limiting object of the present invention, there is provided an apparatus, system, process and/or method for induction hardening of parts wherein a series of stacked components are moved through a high magnetic field as the parts are inductively heated.

It is another and/or alternative non-limiting object of the present invention, there is provided an apparatus, system, process and/or method for induction hardening of parts wherein a series of stacked components are vertically moved through a high magnetic field as the parts are inductively heated.

It is still another and/or alternative non-limiting object of the present invention, there is provided an apparatus, system, process and/or method for induction hardening of parts that can continuously heat and quench a plurality of parts that are sequentially moved past an induction heating coil and through a high magnetic field.

It is yet another and/or alternative non-limiting object of the present invention, there is provided an apparatus, system, process and/or method for induction hardening of parts having improved material properties such as bending-fatigue-life.

It is still yet another and/or alternative non-limiting object of the present invention, there is provided an apparatus, system, process and/or method for induction hardening of parts that having improved material properties such as bending-fatigue-life, ductility and/or conductivity, thus leading to increased power density and reduced weight and cost, while replacing conventional energy-intensive methods like carburization.

It is another and/or alternative non-limiting object of the present invention, there is provided an apparatus, system, process and/or method for induction hardening of parts that includes an ITMP system having improved electrical conductivity properties to enable energy and material savings.

It is still another and/or alternative non-limiting object of the present invention, there is provided an apparatus, system, process and/or method for induction hardening of parts that incorporates the use of a mechanical monolithic column of material to cancel out the magnetic forces that are applied to the column of metal parts that are heated by one or more induction coils.

It is yet another and/or alternative non-limiting object of the present invention, there is provided an apparatus, system, process and/or method for induction hardening of parts wherein oxidation of the metal parts, etc. that form in the column of parts can be reduced by increasing the speed of the components moving through the column and/or reducing the time the components remain in the column.

It is still yet another and/or alternative non-limiting object of the present invention, there is provided an apparatus, system, process and/or method for induction hardening of parts wherein the stacked parts are connected together so that the forces applied to the parts as the parts are moved though the high magnetic field (e.g., a magnet that generates a magnetic field with a magnetic flux density of at 1-30+tesla, 5-15 tesla, 7-9 tesla, etc.) are transferred and shared by the parts in the stacked column.

It is another and/or alternative non-limiting object of the present invention, there is provided an apparatus, system, process and/or method for induction hardening of parts that includes the steps of 1) stacking metal parts onto a column of parts, 2) sequentially moving the column of metal parts into a high magnetic field, 3) induction heat treating the metal parts as the metal parts pass through the high magnetic field, 4) optionally sequentially quenching the heated metal parts, and 5) extracting the optionally quenched metal part from the column of parts.

It is still another and/or alternative non-limiting object of the present invention, there is provided an apparatus, system, process and/or method for induction hardening of parts wherein the quenching step, when used, can be conducted partially or fully on the metal part while the metal part is still part of the column of parts, or partially or fully on the metal part after the metal part is separated from the column of parts.

It is yet another and/or alternative non-limiting object of the present invention, there is provided an apparatus, system, process and/or method for induction hardening of parts wherein the stacked parts are generally connected together so that the forces applied to the parts as the parts are moved though the high magnetic field are transferred and shared by the parts in the stacked column.

It is still another and/or alternative non-limiting object of the present invention, there is provided an apparatus, system, process and/or method for induction hardening of parts wherein a part is removed from the stack of parts after the part has substantially or fully passed out from the high magnetic field so as to not adversely affect the transfer of forces along the column of stacked parts.

It is still yet another and/or alternative non-limiting object of the present invention, there is provided an apparatus, system, process and/or method for induction hardening of parts wherein a part is heated so that about 70% (±0.01-5%) of the carbon in the metal part enters into solution during the heating process.

It is another and/or alternative non-limiting object of the present invention, there is provided an apparatus, system, process and/or method for induction hardening of parts wherein the speed at which the metal part passes through a high magnetic field is controlled so that the residence time of the metal part in the maximum strength and/or uniform field processing position for a given heating temperature is sufficient to obtain the desired amount of carbon in solution in the metal part.

It is still another and/or alternative non-limiting object of the present invention, there is provided an apparatus, system, process and/or method for induction hardening of parts wherein the desired about of carbon in solution in the metal part can be obtain in less than about 15 minutes, typically less than about 10 minutes, more typically less than about 5 minutes, and still more typically about 0.1-200 seconds.

These and other objects and advantages will become apparent to those skilled in the art upon the reading and following of this description taken together with the accompanying drawings.

BRIEF DESCRIPTION OF THE DRAWINGS

Reference may now be made to the drawings, which illustrate various embodiments that the invention may take in physical form and in certain parts and arrangements of parts wherein.

Figure 1:
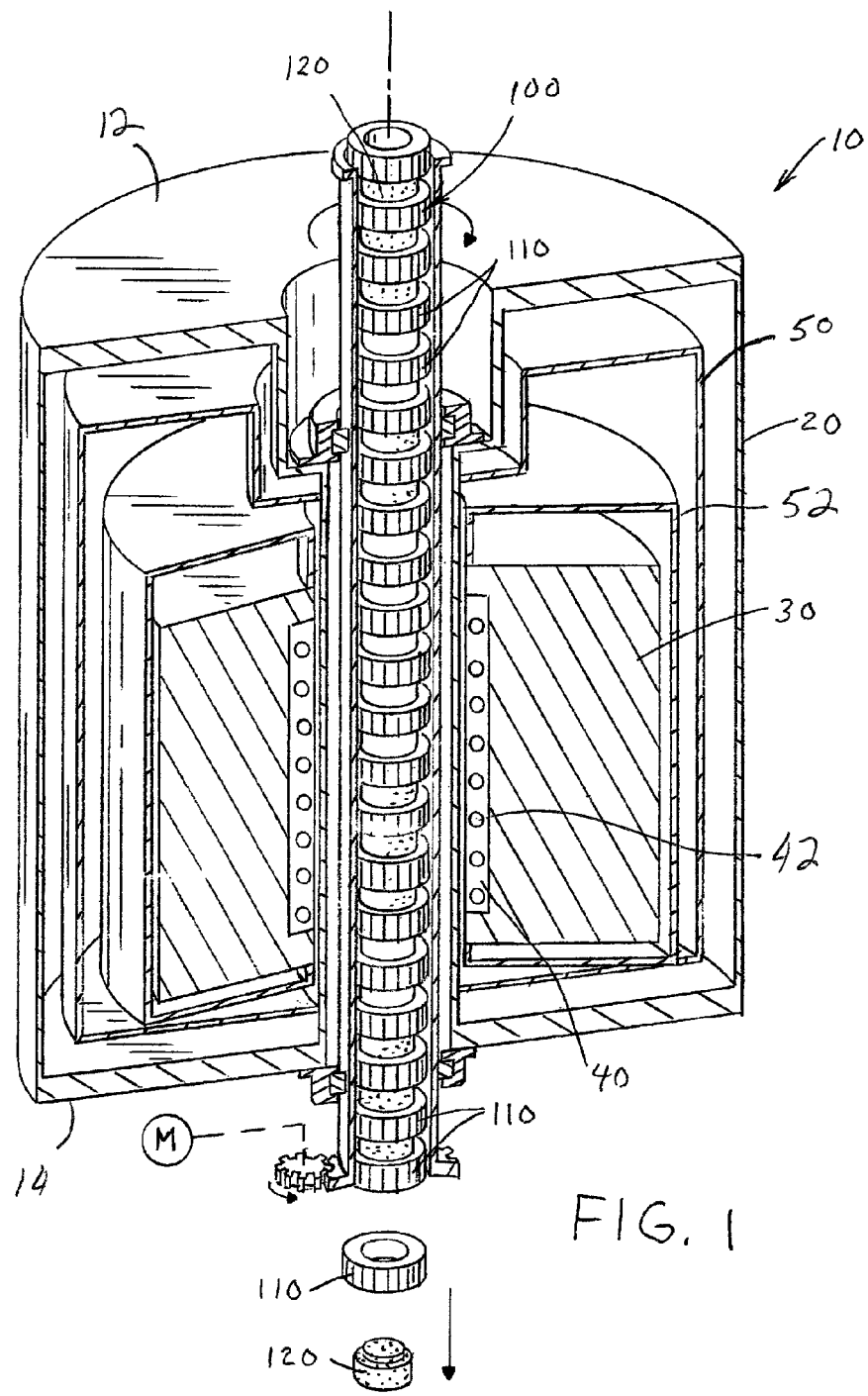
FIG. 1 illustrates a column of gears that are being heated as the gears as passed through a high magnetic field.

DESCRIPTION OF NON-LIMITING
EMBODIMENTS OF THE INVENTION

Referring now in greater detail to the drawings, wherein the showings are for the purpose of illustrating various embodiments of the invention only, and not for the purpose of limiting the invention, the present invention is directed to an apparatus, system, process and/or method for induction hardening of one or more parts that is a lower-energy, non-thermal alternative to conventional high-temperature heat treatment processing. The invention is designed to reduce manufacturing process energy by reducing or eliminating energy-intensive processing steps such as, but not limited to, carburization and tempering.

The present invention uses Induction Thermo Magnetic Processing (ITMP) to process the metal components. The use of ITMP results in the processed components having improved material properties such as bending-fatigue-life, thus leading to increased power density and reduced weight and cost.

The present invention is particularly directed to an induction hardening system, used to harden a carbon-containing metal component (e.g., gear, shaft, etc.) as the components are vertically moved through a high magnetic field (e.g., magnetic flux density of 1-35 tesla and any value or range therebetween) and one or more high frequency induction coils (2-50 kHz and any value or range therebetween). When a plurality of components are to be hardened, the components are oriented into a series of vertically stacked components that are vertically fed into the high magnetic field. The plurality of components are sequentially moved vertically in a column past one or more induction heating coils and a high magnetic field.

In accordance with the invention, the one or more components to be inductively heated typically originate from a location remote to the magnet (e.g., positioned above the magnet), and the component is thereafter moved into and assimilated into a column of components that are then fed into the center of a high magnetic field while being exposed to induction heating by one or more high-frequency induction coils. During the movement of the component in the column of components, each component is subject to substantial axial forces and optional radial forces as the component enters and leaves the high magnetic field.

In one non-limiting method of the invention includes the following steps:

1) providing a carbon-containing metal part (e.g., metal gears, shafts, etc.);
2) moving said metal part into a high magnetic field;
3) induction heat treating the metal parts as the metal parts pass through the high magnetic field so that about 65%-75% of the carbon in the metal part enters into solution during the induction heating process; and
4. optionally quenching the heated metal part.

In another non-limiting method of the invention includes the following steps:

1) stacking carbon-containing metal parts (e.g., metal gears, shafts, etc.) onto a column of parts;
2) sequentially moving the column of metal parts into a high magnetic field;
3) induction heat treating the metal parts as the metal parts pass through the high magnetic field so that about 65%-75% of the carbon in the metal part enters into solution during the induction heating process; and
4. optionally quenching the heated metal parts.

In the two non-limiting methods set forth above, the time period that the metal part is subjected to induction heating is generally about 2-150 seconds. The magnetic flux density of the high magnetic field is generally about 2-25 tesla (e.g., 7-10 tesla, 7-9 tesla, etc.) and the high frequency of the induction coils is generally about 5-40 kHz. When multiple parts are stacked in a column, the parts are generally connected together as the parts are passed through the high magnetic field and induction heated. The parts can also be connected together during the quenching process. The parts are generally applied to the column of parts and/or removed from the column of parts when the part is exposed to less than about 5% of the maximum strength and/or uniform field of the high magnetic field. Generally the metal parts are not moved along the longitudinal axis (e.g., vertical axis) of the metal part while the metal part is being heating. The metal part can be optionally rotated about the longitudinal axis of the metal part during the heating process. When multiple metal parts are connected together, each metal part in the column can be indexed passed the heating process after the metal part has been heated; however, this is not required.

One non-limiting apparatus for heating and quenching metal parts in accordance with the present invention is illustrated in FIG. 1. FIG. 1 illustrates a heating device 10 that is designed to receive a column 100 form of a plurality of gears 110 and a plurality of spacers 120 that connected together the gears as the column moves vertically through the heating device.

The heating device generally includes a housing 20, magnet system 30, and an induction heating system 40. The magnet system 30 and an induction heating system 40 can optionally be contained in One or more shielded or non-shielded casings 50, 52. The magnet system is generally an electromagnetic system. The magnetic system generally includes a magnetic core and several electrical windings used to control the strength of the magnetic field. The induction heating system generally includes a plurality of induction coils 42. The induction coils are generally coiled by cooling fluid flowing through the coils; however, this is not required. The configuration of the electromagnetic system is non-limiting. Generally, the electromagnetic system partially or fully encircles the induction coils of the induction heating system. At or near the base of the heating device can be a quench system use to cool the heated metal gears.

The column of gears is designed to move vertically from the top 12 of heating device 10 to the bottom 14 of heating device 10. The gears are connected together by a connector 120 as the gears move in the column through the heating device; however, it can be appreciated that the gears can be connected directly together. Generally, the connector is formed of a material (e.g., ceramic material, etc.) that is not attracted to a magnetic and which does not heat up, or heats up very little, when exposed to induction heating. Generally, the connector is absent a ferrous material. Generally, the connector is a non-metallic material; however, this is not required. However, the material of the connector needs to be temperature resistant and durable so as to resist damage when in contact with the heated metal parts. The size, shape and configuration of the connector are non-limiting.

The column of gears is illustrated as being rotated by a motor M as the column moves through the heating device; however, this is not required. The rotation speed of the column is not limited.

The column of stacked metal parts are loaded above the heating device and then are vertically moved downwardly through the magnetic field generated by the induction coil that is used to heat the metal gears. The arrangement and method by which the gears are fed to the gear stack are non-limiting.

During the entry of the metal gear into the high magnetic field at or near the top of the heating device, the gear will be pulled/sucked into the heat device by the strong magnet field being generated by the magnet system. At a location at or near the maximum strength and/or uniform field processing position (e.g., about 35-60% from the bottom of the magnet system), the forces applied to the metal part are neutralized by the pushing and pulling of the other metal parts in the stacked column. After the metal part moves past the location at or near the maximum strength and/or uniform field processing position, the metal part resists extraction. The entry and extraction forces on the metal part can increase or decrease based on the speed at which the metal part is moved through the column. Generally, the part is removed from the stack of parts after the part has substantially or fully passed out from the magnetic field of the high magnetic field so as to not adversely affect the transfer of forces along the column of stacked parts. If the part is to be quenched, the part is generally removed from the column after the part has been fully or partially quenched; however, this is not required.

The speed at which the metal parts are moved through the heating device is selected so as to achieve a desired amount of carbon in solution during the heating of the metal part. During the induction heating of a metal part, about 65-75% of the carbon in the metal part needs to enter into solution during the heating process in order for the metal part to exhibit improved fatigue strength. If the metal part does not achieve the desired amount of carbon in solution during the heating process, then little or no improvement in fatigue strength is achieved. Likewise, if too much carbon enters into solution during the heating process, then little or no improvement in fatigue strength is also achieved. Generally, the residence time of the metal part in the heating device is about 2-150 seconds to achieve the desired percentage of carbon in solution.

Generally the gears are each indexed through the heating device. Typically each gear is not vertically moved past the heating device as the gear is being heated. Once the gear has been heated, the gear is indexed to the next position (e.g., quench position, secondary heating position, cooling position, disengagement position to disengage the gear from the spacer, etc.) As can be appreciated, the gear can be designed to be moved through the heating device as the gear is heated. The gear may be rotated while the gear is being heated; however, this is not required. If the gear is quenched, the gear is generally not vertically moved past the quenching system as the gear is being quenched; however, this is not required. The gear may be rotated while the gear is being quenched; however, this is not required.

Figure 2:
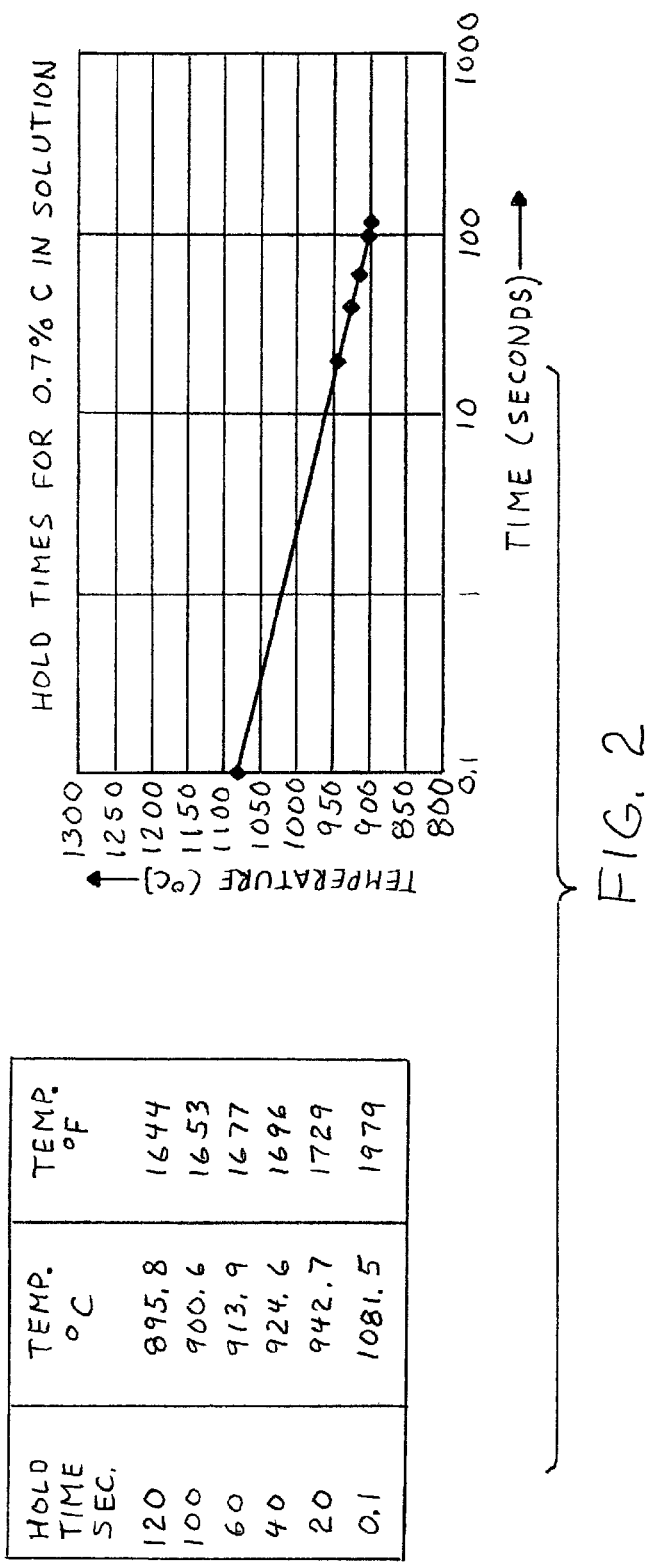
FIG. 2 illustrates a time-temperature graph in accordance with the present invention; and, FIGS. 3-4 illustrate a metal part heated by the apparatus, process and method in accordance with the present invention.

Referring now to FIG. 2, there is illustrates a time-temperature graph in accordance with the present invention. The graph illustrated the residence time of a metal part that is passing through a high magnetic field having a maximum magnetic flux density of about 8-9 tesla to achieve about 70% of the carbon in the metal part to be in solution based on the temperature of the metal part. The high frequency of the induction coils as about 20-30 kHz. As is illustrated by the graph, the higher the temperature of the metal part, the shorter the residence time needed for the metal part in the high magnetic field to achieve about 70% of the carbon in the metal part in solution. For example, when the metal part is heated to about 942.7° C., the residence time needed for the metal part in the high magnetic field to achieve about 70% of the carbon in the metal part in solution is about 20 seconds. The graph illustrates the heating of a non-limiting metal part formed from Steel 51000 (i.e., 1% carbon, 0.37% manganese, 0.007% sulphur, 0.25% silicon, 1.44% chromium, 0.14% nickel, 0.05% molybdenum, 0.19% copper, 0.027 aluminum, balance iron). As can be appreciated, the carbon content of the metal part can be other than 1%. For example, the carbon content of the metal can be greater than or equal to about 0.1% carbon. The carbon content of the metal part is generally less than 3%; however, this is not required. Generally, the carbon content of the metal part is about 0.4-1.5%, and typically about 0.5-1.2%. As can be appreciated, metals formed of other alloy compositions may have a different curve in order that about 70% of the carbon in the metal part is in solution during the heating of the metal part. For instance, a metal part having a carbon content of less than 0.8% carbon will likely achieve 70% carbon in solution in less time during the heating process as compared to a metal part having 1.2% carbon. The relationship of the time to temperature curve to achieve 70% carbon in solution is believed to be a generally linear curve for a certain amount of carbon content of the metal part. As can be appreciated, the linear nature of the curve facilitates in the programming of a control system to control the residence time of the metal part in the heating device to about the desired amount of carbon in solution on the metal part.

The maximum heating temperature of the metal part is generally about 850-1300° C. (1562° F.-2372° F.) as the metal part passes through the heating device. The residence time of the time of the metal part in the heating device is generally about 0.1 to 500 seconds, typically about 0.1 to 200 seconds, more typically about 0.1 to 120 seconds, still more typically about 1-100 seconds, yet still more typically about 2-60 seconds, and still further about 10-40 seconds.

Figure 4:
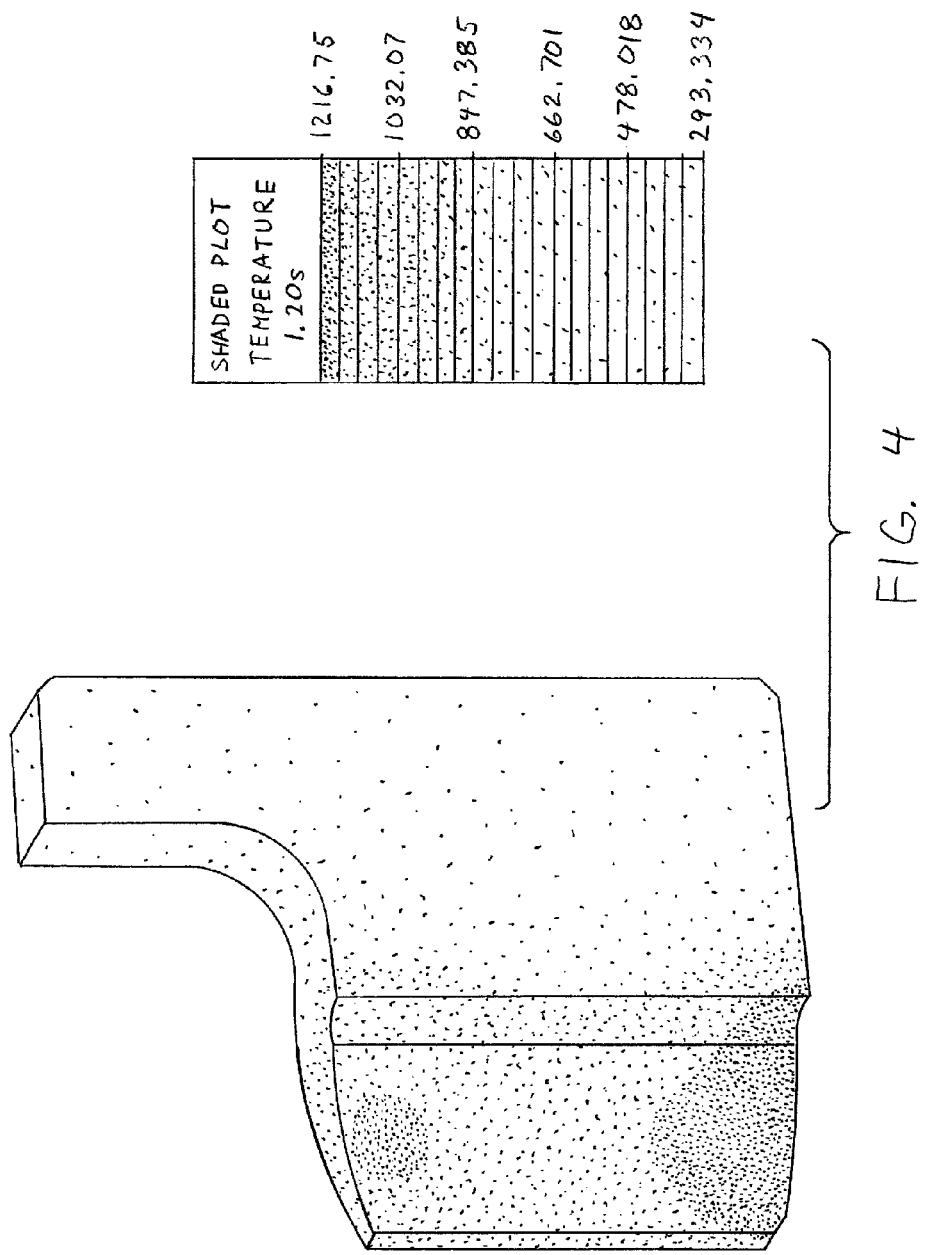

Referring now to FIGS. 3-4, there is illustrated a metal part that was heated by the process in accordance with the present invention. FIG. 3 illustrates that the metal part was heated for about 20-35 seconds and the part was effectively heated in this short time period to obtain the desired amount of carbon in solution. FIGS. 3 and 4 illustrate the different temperatures the metal part was heated to during the induction heating process.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

What is claimed:

1. A method for inductively heating comprising:
   a. providing a carbon-containing metal part;
   b. providing a heating apparatus, said heating apparatus including a magnet system and an induction heating system, said magnet system designed to create a magnetic field with a magnetic flux density of at least 0.8 tesla, said induction heating system including at least one induction coil;
   c. moving said metal part in to said magnetic field; and,
   d. induction heat treating said metal part as said metal part passes through said high magnetic field so that about 65%-75% of the carbon in said metal part enters into solution during the induction heating process.

2. The method as defined in claim 1, including the step of quenching said heat treated metal part.

3. The method as defined in claim 1, wherein said metal part is vertically moved and rotated through said high magnetic field and said induction heating system.

4. The method as defined in claim 2, wherein said metal part is vertically moved and rotated through said high magnetic field and said induction heating system.

5. The method as defined in claim 1, wherein said metal part is connected to a column of metal parts, said metal part passed through said magnetic field and inductively heated while connected to said column of metal parts.

6. The method as defined in claim 4, wherein said metal part is connected to a column of metal parts, said metal part passed through said magnetic field and inductively heated while connected to said column of metal parts.

7. The method as defined in claim 1, wherein said magnetic field has a magnetic flux density of 0.8-30 tesla, said induction heating system including induction coils powered by a current frequency of about 5-40 kHz.

8. The method as defined in claim 6, wherein said magnetic field having a magnetic flux density of about 0.8-30 tesla, said induction heating system including induction coils powered by a current frequency of about 5-40 kHz.

9. The method as defined in claim 1, wherein said metal part contains iron and about 0.1%-3% wt % carbon.

10. The method as defined in claim 8, wherein said metal part contains iron and about 0.1%-3% wt% carbon.

11. A method for inductively heating comprising:
a. providing a carbon-containing metal part, said metal part contains a majority weight percent iron and about 0.1%-3% wt% carbon;
b. providing a heating apparatus, said heat apparatus including a magnet system and an induction heating system, said magnet system designed to create a magnetic field with a magnetic flux density of at least 0.8 tesla, said induction heating system including at least one induction coil, said at least one induction coil powered by a current frequency of about 5-40 kHz;
c. moving said metal part vertically in to said magnetic field;
d. induction heat treating said metal part as said metal part passes through said high magnetic field so that about 65%-75% of the carbon in said metal part enters into solution during the induction heating process; and,
e. quenching said heated-treated metal part.

12. The method as defined in claim 11, wherein said metal part is connected to a column of metal parts, said metal part passed through said magnetic field and inductively heated while connected to said column of metal parts, each of said metal part in said column connected together by a connector, said connector formed of a different material than said metal part, said connector absent a ferrous material.

13. The method as defined in claim 11, wherein said magnetic field has a magnetic flux density of about 1-25 tesla.

14. The method as defined in claim 12, wherein said magnetic field has a magnetic flux density of about 1-25 tesla.

15. The method as defined in claim 11, wherein a time period said metal part is subjected to said step of induction heat treating is about 0.1-500 seconds.

16. The method as defined in claim 14, wherein a time period said metal part is subjected to said step of induction heat treating is about 0.1-500 seconds.

17. The method as defined in claim 16, wherein a time period said metal part is subjected to said step of induction heat treating is about 2-150 seconds.

18. The method as defined in claim 11, wherein said magnetic field has a magnetic flux density of about 5-12 tesla, said at least one induction coil powered by a current frequency of about 20-30 kHz, a time period said metal part is subjected to said step of induction heat treating is about 2-50 seconds, a maximum heating temperature of said metal part during said step of induction heat treating is about generally about 850-1300° C.

19. The method as defined in claim 17, wherein said magnetic field has a magnetic flux density of about 5-12 tesla, said at least one induction coil powered by a current frequency of about 20-30 kHz, said time period said metal part is subjected to said step of induction heat treating is about 2-50 seconds, a maximum heating temperature of said metal part during said step of induction heat treating is about generally about 850-1300° C.

20. The method as defined in claim 19, wherein said metal part is rotated as it moves at least partially through said magnetic field.

* * * * *